(12) United States Patent
Duff et al.

(10) Patent No.: US 9,590,698 B1
(45) Date of Patent: Mar. 7, 2017

(54) POWER LINE NETWORK APPARATUS, SYSTEM AND METHOD (71) Applicant: Landis+Gyr Technologies, LLC, Pequot Lakes, MN (US)

(72) Inventors: John F. Duff, Breezy Point, MN (US); Rolf Flen, Pequot Lakes, MN (US); Scott H. Christiansen, Brainerd, MN (US); Roland Johnson, Breezy Point, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 0 days.

(21) Appl. No.: 14/665,847

(22) Filed: Mar. 23, 2015

Related U.S. Application Data (63) Continuation of application No. 13/335,487, filed on Dec. 22, 2011, now Pat. No. 8,989,693.

(51) Int. Cl.
   *H04B 3/00* (2006.01)
   *H04L 25/00* (2006.01)
   *H04B 3/54* (2006.01)

(52) U.S. Cl.
   CPC .................................... *H04B 3/54* (2013.01)

(58) Field of Classification Search
   CPC ............................................ H04B 2203/5416
   USPC ....................................................... 375/258
   See application file for complete search history.

(56) References Cited

U.S. PATENT DOCUMENTS

| | | | |
|---|---|---|---|
| 5,581,229 A | 12/1996 | Hunt | |
| 6,154,488 A | 11/2000 | Hunt | |
| 6,177,884 B1 | 1/2001 | Hunt et al. | |
| 6,998,963 B2 | 2/2006 | Flen et al. | |
| 7,102,490 B2 | 9/2006 | Flen et al. | |
| 7,145,438 B2 | 12/2006 | Flen et al. | |
| 7,180,412 B2 | 2/2007 | Bonicatto et al. | |
| 7,184,861 B2 | 2/2007 | Petite | |
| 7,209,840 B2 | 4/2007 | Petite et al. | |
| 7,224,740 B2 | 5/2007 | Hunt | |
| 7,236,765 B2 | 6/2007 | Bonicatto et al. | |
| 7,346,463 B2 | 3/2008 | Petite et al. | |
| 7,369,579 B2 | 5/2008 | Logvinov et al. | |
| 7,432,824 B2 | 10/2008 | Flen et al. | |
| 7,443,313 B2 | 10/2008 | Davis et al. | |
| 7,468,661 B2 | 12/2008 | Petite et al. | |
| 7,706,320 B2 | 4/2010 | Davis et al. | |

(Continued)

*Primary Examiner* — Sam K Ahn
*Assistant Examiner* — Fabricio R Murillo Garcia
(74) *Attorney, Agent, or Firm* — Crawford Maunu PLLC

(57) ABSTRACT

Various aspects of the instant disclosure are directed towards a method for communicating time-based data in a power line communication system. In accordance with one or more example embodiments, firmware is downloaded to a multitude of endpoints over power distribution lines carrying alternating current (AC) power. Endpoint devices targeted for changes to stored firmware are grouped and the firmware is delivered in chunks to each group. As devices receive a particular chunk of firmware, the device advances to a next stage and provides information indicative of this stage, based upon which subsequent chunks of firmware are communicated. This occurs (e.g., on a daily cycle) until the endpoint has received all firmware for an update, after which the endpoint(s) are re-started using the firmware. Accordingly, such updates can be carried out in a cyclic and verifiable manner.

16 Claims, 5 Drawing Sheets

(56) References Cited

U.S. PATENT DOCUMENTS

| | | |
|---|---|---|
| 7,738,999 B2 | 6/2010 | Petite |
| 7,742,393 B2 | 6/2010 | Bonicatto et al. |
| 7,774,530 B2 | 8/2010 | Haug et al. |
| 7,791,468 B2 | 9/2010 | Bonicatto et al. |
| 7,877,218 B2 | 1/2011 | Bonicatto et al. |
| 7,978,059 B2 | 7/2011 | Petite et al. |
| 8,144,816 B2 | 3/2012 | Bonicatto et al. |
| 8,144,820 B2 | 3/2012 | Bonicatto |
| 8,194,789 B2 | 6/2012 | Wolter et al. |
| 8,238,263 B2 | 8/2012 | Kohout et al. |
| 2005/0017848 A1* | 1/2005 | Flen .................. H04B 3/542 340/870.02 |
| 2005/0083925 A1* | 4/2005 | Bonicatto et al. ............ 370/389 |
| 2005/0120343 A1 | 6/2005 | Tai et al. |
| 2008/0304595 A1 | 12/2008 | Haug et al. |
| 2011/0038288 A1* | 2/2011 | Osterloh ................ H04Q 9/00 370/310 |
| 2011/0121952 A1 | 5/2011 | Bonicatto et al. |
| 2011/0176598 A1 | 7/2011 | Kohout et al. |
| 2011/0218686 A1 | 9/2011 | McHann, Jr. et al. |
| 2011/0249678 A1 | 10/2011 | Bonicatto et al. |
| 2012/0057592 A1 | 3/2012 | Zeppetelle et al. |
| 2012/0076212 A1 | 3/2012 | Zeppetelle et al. |
| 2012/0084559 A1 | 4/2012 | Bonicatto |
| 2012/0106664 A1 | 5/2012 | Bonicatto et al. |
| 2013/0145452 A1* | 6/2013 | Ollukaren ........... H04L 63/0272 726/15 |

\* cited by examiner

POWER LINE NETWORK APPARATUS, SYSTEM AND METHOD

BACKGROUND

Service providers utilize distributed networks to provide services to customers over large geographic areas. For example, power companies use power distribution lines to carry power from one or more generating stations (power plants) to residential and commercial customer sites alike. The generating stations use alternating current (AC) to transmit power over long distances via the power distribution lines. Long-distance transmission can be accomplished using a relatively high voltage. Substations located near the customer sites provide a step-down from the high voltage to a lower voltage (e.g., using transformers). Power distribution lines carry this lower-voltage AC from the substations to the endpoint devices customer sites.

Communications providers may utilize a distributed communications network to provide communications services to customers. Similarly, power companies utilize a network of power lines, meters, and other network elements to provide power to customers throughout a geographic region and to receive data about the power usage. However, data communication between a central collector and many thousands of endpoint devices over power distribution lines can be a particularly challenging issue. The sheer number of endpoint devices contributes to a host of issues including synchronization, communication bandwidth and cost concerns. Moreover, while configuring or updating communication devices on such power distribution lines can be achieved using a field tool in the physical presence in each endpoint, this approach can be expensive and time consuming.

These and other issues present challenges to the design and operation of power-line communication apparatuses, systems and networks.

SUMMARY

The present disclosure is directed to systems and methods for use with coordinated communications between devices and over power distribution lines. These and other aspects of the present disclosure are exemplified in a number of illustrated implementations and applications, some of which are shown in the figures and characterized in the claims section that follows.

Particular embodiments of the instant disclosure are directed towards communicating data such as firmware over power distribution lines carrying alternating current (AC), over which one or more endpoint devices provide utility usage data. Endpoint devices that are targeted for changes to stored firmware are identified and selected based upon available bandwidth on the power distribution lines. Based on timing indicated at least in part by the alternating current, a command is sent to the selected endpoint devices and a first subset/chunk of the firmware is sent to selected endpoint devices that respond to the command. At least one additional subset of the firmware is sent to at least some of the selected endpoint devices, based upon a response or status of the endpoint devices (e.g., with such a response identifying a firmware update stage of the device(s)).

In some implementations, the firmware chunks are sent from one or more collectors on a repeated basis during each update stage, with next sets of firmware sent at subsequent update stages. Accordingly, a multitude of endpoint devices may be updated using a cyclic, low-bandwidth approach that also facilitates stage advancement of the firmware update under conditions in which less than all endpoints receive firmware chunks for each respective stage. Further, endpoints that miss firmware or otherwise fall behind can be re-grouped for another firmware update sequence. Such firmware (e.g., instructions residing in non-volatile memory) can thus be updated on a variety of devices.

Another embodiment is directed to a circuit-based apparatus having a processing circuit and a transceiver circuit that communicates data over power distribution lines that carry power using alternating current (AC), based on timing indicated at least in part by the alternating current. The processing circuit identifies one or more endpoint devices for updating firmware thereat, and generates one or more packets including information that identities one or more endpoint devices, a firmware update request, and (in some instances) a first set of firmware. The packets are transmitted via the transceiver circuit, via which data indicating an update status of the one or more endpoint devices is received. Based upon the data indicating an update status, the processing circuit sends one or more second packets having identifying information that identifies one or more endpoint devices, and another set of firmware, via the transceiver circuit. The packets or firmware may also be implemented to provide a request to restart one or more endpoint devices.

In accordance with one or more embodiments, a processing circuit is implemented to identify one or more endpoint devices for updating firmware, and to generate one or more first configuration packets having identifying information that identifies one or more endpoint devices, and generate a request to update firmware and a first set of firmware. The one or more first configuration packets are communicated, via a transceiver circuit, over power distribution lines that carry power using alternating current (AC), based on timing indicated at least in part by the alternating current. Data indicating an update status of the one or more endpoint devices is received via the transceiver, and in response to the received data indicating an update status, one or more second configuration packets having identifying information that identifies one or more endpoint devices is generated and provided, with a second set of firmware, to the transceiver circuit for transmission. A request to restart the one or more endpoint devices to use the first and second sets of firmware is further provided.

The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present invention are believed to be applicable to a variety of different types of devices, systems and arrangements for communications between devices over power distribution lines. While the present disclosure is not necessarily limited to such applications, various aspects of the disclosure may be appreciated through a discussion of various examples using this context. Moreover, aspects of the following discussion pertaining to methods may be implemented with apparatuses or systems.

Various example embodiments are directed to the configuration of endpoints in a power-line communications system, employing power distribution lines carrying alternating current (AC) power in which bandwidth is shared between one or more groups of the endpoint devices. Each of the endpoint devices communicates data over the power distribution lines, such as utility-based data as provided to a data-collecting circuit or other communications circuit, and from which information regarding utility or other characteristics at the endpoint can be obtained. Certain embodiments facilitate the communication of firmware to a multitude of such endpoints (e.g., hundreds of thousands), using a relatively limited bandwidth in the power distribution lines, and can do so in connection with the communication of the utility-based data.

Particular embodiments of the instant disclosure are directed towards communicating data such as firmware or other data often stored in non-volatile memory, over power distribution lines carrying alternating current (AC) power, with bandwidth shared between endpoint devices that provide utility usage data over the power distribution lines. The firmware can be sent in chunks, or portions, to one or more groups of endpoints that receive and store the firmware. The groups may be identified, for example, as part of an earlier communication, with specific endpoints alerted to a firmware update with a communication including an identification for that group. Status checks (e.g., daily) can be used to identity a status of respective endpoints and further identify which endpoints are ready to proceed to subsequent stages for receiving further chunks of firmware. Once endpoints have received a full set of firmware, the endpoints re-boot or otherwise implement the firmware. In some implementations, the endpoints re-boot with new firmware at a time specified in a command identifying the endpoint's group for receiving new firmware.

For example, endpoints may need to be re-flashed in the field (e.g., with flash memory erased and replaced), to configure the endpoints with new firmware, correct errors or add features. Using communications as discussed above, the endpoints can be re-flashed using a powerline (PLC) communication medium. The endpoint buffers firmware (e.g., a new firmware image) received over the communication medium, to facilitate delivery of the firmware in parts. Using this approach, the firmware can be communicated over power distribution lines that also carry alternating current and data provided at each endpoint, without necessarily affecting the normal operation of the endpoints and doing so over a period of time that facilitates such firmware communication (e.g., over one or several days).

In a more particular example embodiment, endpoint devices (as above) that are targeted for configuration (e.g., changes to stored firmware) are identified. A plurality of the endpoint devices are selected for the communication of firmware based upon available bandwidth on current-carrying power distribution lines to which the endpoints are connected. Using timing indicated at least in part by the alternating current, a command is communicated over the power distribution lines to the selected endpoint devices.

In response to an acknowledgement of the command from (some or all of) the selected endpoint devices, a first subset of firmware is sent to the selected endpoint devices. In some instances, this first subset is sent to only those endpoint devices responding, and in other instances this first subset is sent to all endpoint devices, based upon a response rate (e.g., if a certain threshold of the endpoints acknowledge, a response may be sent to all of the selected endpoints). One or more additional subsets of firmware are sent to at least some of the selected endpoint devices, based upon status condition data received from the endpoint devices over the power distribution lines and interleaved with utility usage data provided by the endpoints.

In various example embodiments, the above approaches are carried out based on a cyclic status communication indicative of a configuration stage of the endpoint corresponding to subsets of the firmware received at the endpoint. For each additional subset of the firmware, a configuration stage of the endpoints is determined based on the cyclic status communications from each endpoint. The additional subset is then communicated to endpoints based upon the respectively-determined configuration stage of each endpoint.

The firmware may be communicated, for example, according to a communication protocol and timing for cyclic communications of utility-based data from the endpoints to one or more collectors, and an available bandwidth on the power distribution lines. In some implementations, the firmware is communicated in stages based upon a number of endpoint devices acknowledging receipt of a subset of firmware communicated in a previous stage. This is carried out until a full set of the firmware has been communicated.

Endpoint devices may be identified and grouped using one of a variety of approaches. In some implementations, endpoint devices are identified by assigning a group identification. The command (e.g., a broadcast command) uses the group identification to identify those endpoints that are to receive the command (e.g., with the respective endpoints listening for their group identification). A different group identification can be assigned to one or more endpoint devices, based upon a status condition indicating that the device(s) has not received data or is otherwise behind in a stage. Further, the command may be communicated to different sets of endpoint devices at different times, based upon an available bandwidth on the power distribution lines.

The respective subsets of firmware can be communicated on one or more of a variety of cycles. In some embodiments, each respective subset of firmware is communicated repeatedly from one or more collectors serving the particular group of endpoints being updated, until acknowledgement of delivery of the subset from a predefined number of the selected endpoint devices. In other embodiments, endpoints failing to acknowledge receipt of a particular subset may be assigned a new group identification, and one or more missing subsets may be separately communicated to the endpoints in the new group.

Other embodiments are directed to a circuit-based apparatus having a processing circuit and a transceiver that communicates data over power distribution lines as discussed herein. The processing circuit identifies endpoint devices for updating firmware, and provides packets identifying one or more endpoint devices, a firmware update request, and a chunk of firmware. Based upon an update status of the one or more endpoint devices as received via the transceiver, additional packets including a second set of firmware are sent to endpoint devices identified therein (e.g., that have advanced to a proper stage). With one or more of the packets, information identifying a time at which endpoints are to re-start (with the new firmware) can also be communicated. In addition, for endpoints having a delinquent status, a different group ID is assigned with additional packets being sent to those endpoints having the original group ID. Packets that the endpoints having the second group ID have missed can be re-sent.

Where collector circuits as discussed herein are implemented to communicate with endpoints, such circuits may receive and store the firmware packets from the transceiver, and control the respective communication of chunks of the firmware to endpoints that are connected thereto.

Endpoint configuration is carried out using one or more of a variety of approaches. For example, a re-flash (or, e.g., reimage or reconfiguration) operation may be initiated automatically and/or via interaction at a user interface. Aspects of a re-flash may include specifying one or more endpoints to be re-flashed (e.g., by endpoint serial number or group ID), and optionally which substation(s) or switching group(s) should be included. Appropriate data such as an async request packet definition that will be sent back by an endpoint is identified, as may be a time of day that the response should be sent (e.g., for scheduling purposes based upon available bandwidth on power distribution lines serving a multitude of endpoints). In some instances, the async request packet definition may alternatively be specified as part of a configuration group setup, and not selected on the re-flash setup screen. Other configuration options, such as whether an endpoint returns an alarm communication as configuration stages advance, or an identified starting (old) firmware/configuration version, can optionally be specified as well. This alarm can be sent in place of a regularly scheduled communication (e.g., at a predefined time interval for each endpoint), or otherwise implemented so as not to interrupt packet communication during the reconfiguration process. In addition, the target (new) firmware/configuration version is identified, as is timing information or a specific time for use in directing each endpoint to activate the new firmware if complete (e.g., if a full set of data for the firmware reaches the endpoint). This information may, for example, be saved in a database for use in updating each endpoint.

As consistent with the above, the operation of re-flash/reconfiguration functions can be carried out on a cyclic basis, to facilitate the communication of data for the operation to a multitude of endpoints over power distribution lines having a limited bandwidth for doing so, and further in connection with the communication of utility-based data over the power distribution lines as well. In some implementations, new configuration (e.g., firmware) is sent downstream in little portions with a low enough priority (for the collector's internal queue) so that it will essentially be a background task, such as at times when no other DS commands are being sent. In other implementations, the configuration communication is assigned a particular priority that may speed up the delivery thereof.

A user interface may be implemented at a command center to obtain user inputs for controlling aspects of a reconfiguration process, such as for setting up a re-flash operation (e.g., to identify which endpoints/endpoint groups/substations would be part of a re-flash). Such a user interface can also be implemented for monitoring a re-flash process, troubleshoot any endpoints that are not progressing through re-flash steps, and to show data characterizing historical re-flashing operations.

In a particular implementation, a new scheduled task (re-flash task) is initiated in a command center once per hour (by default), and checked to see if there is any re-flash work to do (e.g., start re-flash operations, or monitoring running operations). For each start re-flash command, the command is sent to the corresponding endpoints, along with async packet definition data as discussed above. The start re-flash command also specifies a starting virtual group number, which the next batch of re-flash commands will be group-addressed to.

As endpoints receive the command, they notify with an alarm that they heard the start re-flash, such as by returning alarm data interleaved with utility-based data sent from the respective endpoints. A first portion of the new firmware is sent to appropriate collectors to which respective endpoints are connected via power distribution lines, and the communication of the first portion is repeated at a specified priority until the collectors are told otherwise. A database at one or both of the command center and a collector is updated as to which re-flash commands were sent to the endpoints in each period between scheduled task runs (e.g., per hour by default). In some implementations, stage advance alarms are enabled and progress is monitored using these events.

The endpoints may provide an acknowledgement of firmware delivery using one or more of a variety of approaches. For example, where the endpoint firmware is divided into a specific number of blocks having an associated signature/CRC, each block can be checked by the endpoint to determine if the block is intact and complete. The index of the first incomplete block can be provided by the endpoint and used to determine progress.

In some implementations, an organizational setting is made with respect to advancing communication of a next portion (or block) of firmware data, to set a number of endpoints that must receive a particular portion before a next portion is sent to the endpoints. For example, if the setting is 99% at each stage, after 32 stages there would be about ~732 that are finished out of 1000 to start with. Accordingly, a combination of one or more of a user-defined threshold, set number percentage and/or time limits can be used to obtain such an advance in communication. With these approaches, the firmware re-flash process can proceed without requiring that all endpoints receive all data, which facilitates advancement of the process in spite of potential communication errors with less than all of the endpoints.

In other implementations, such an organizational stage is not used, and the firmware delivery advances after a predetermined set of portions have been communicated (e.g., collectors may transmit a particular set of firmware for a period of one day, after which a next set of firmware is communicated, independently from any acknowledgement from the respective endpoints to which the firmware is communicated).

When an endpoint has received all commands for a particular stage (e.g., and checks the received data, such as via CRC), the endpoint advances to a next stage. Periodically (e.g., once per day), the endpoints send back a re-flash async message, which will include the stage the endpoint is at, and the database is updated to reflect what stage each endpoint is at.

When an endpoint has received all the new firmware and the CRCs match, it will reboot to the new firmware at the time sent in the start-flash command as discussed above, and then send a "re-flash finished" alarm. If this alarm is missed, this event can be discerned because the endpoint will stop sending the re-flash progress async each day. After all the endpoints have finished or if a user cancels the re-flash task, the collectors are controlled to stop sending the firmware. For instance, a user may cancel a re-flash task if a majority of endpoints in a particular group have been re-flashed with new firmware. Remaining endpoints can be re-flashed manually (e.g., in the field using a handheld computer/processing device), or can be added to another group of endpoints to be re-flashed at a subsequent time.

Firmware and other data can be communicated using a variety of approaches. In some embodiments, during an async process, a certain number of data P bits are available. A re-flash async packet can include a re-flash block number or group ID (to indicate which stage the endpoint is at), and a firmware version (confirms the starting firmware version and, after receiving a full set of new firmware, confirms the new firmware version). The async packet definition can be sent in a start-flash command, and is returned once each day. When the re-flash is complete, the packet async definition is sent one more time to indicate an end stage and ending firmware version, and then is no longer sent.

In some implementations, one or more endpoints can receive reconfiguration type data from multiple collectors (e.g., firmware). Each collector may operate on a different channel within a power distribution line, with the endpoints respectively monitoring several channels (e.g., using the channels in parallel for an endpoint). Using this approach, different blocks can be simultaneously sent from different collectors or the same blocks can be sent in parallel.

In certain embodiments, firmware data is delivered to facilitate a patch installation, in which a portion of stored firmware is replaced, augmented or otherwise changed. The endpoint uses new signatures to select and copy blocks from active code to new code so that blocks that already exist in the endpoint do not need to be sent for the new image. Accordingly, firmware communication approaches as discussed above can be implemented in connection with a patch installation, in a manner similar to that as with endpoint reconfiguration with an entirely new set of firmware.

In some implementations, the endpoint stores a limited set of blocks in nonvolatile memory (data flash) at a time. Once the set of blocks is complete, the endpoint can wait for a specific time to transfer them to inactive program flash. Transferring the set of blocks can impact the endpoint's upstream transmitter. In this context, the transfer can be limited to certain times to reduce/minimize upstream packet corruption.

Figure 1:
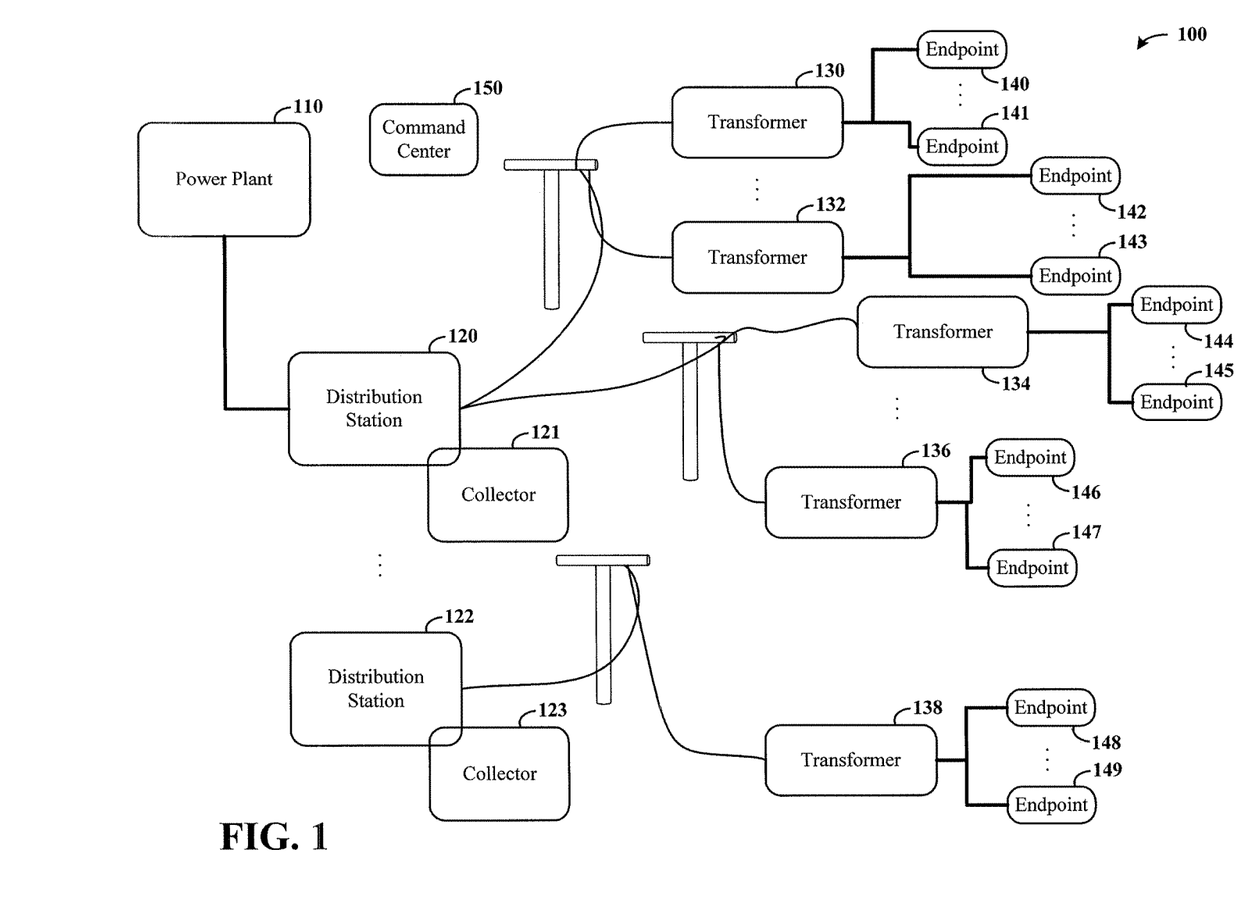
FIG. 1 shows communications apparatuses and a system, as may be implemented in connection with one or more embodiments of the present disclosure.

Turning now to the Figures, FIG. 1 shows communications apparatuses and system 100, as may be implemented in connection with one or more example embodiments of the present disclosure for communication with endpoints for configuration thereof. As discussed herein, the various approaches may be implemented in connection with a variety of different power line communication network environments, using one or more power lines and may involve one or more transformers and distribution stations. Accordingly, FIG. 1 shows one such implementation.

A power plant 110 distributes power to a plurality of distribution stations (e.g., substations) including stations 120 and 122. Each respective distribution station has a collector 121 and 123, which can be implemented with collectors as discussed herein. The distribution station 120 is coupled to distribute power to transformers 130, 132, 134 and 136. Distribution station 122 is coupled to distribute power to transformer 138. Other configurations may also be implemented, such as with distribution station 122 being coupled to also supply power to one or more of the transformers 130, 132, 134 and 136.

Each of the respective transformers is coupled to one or more endpoints, which are respectively coupled to receive utility-based data such as power meter data, readings of water utilities, readings of gas utilities, status conditions or diagnostic data. By way of example, endpoints 140 and 141 are coupled to transformer 130, endpoints 142 and 143 are coupled to transformer 132, endpoints 144 and 145 are coupled to transformer 134, endpoints 146 and 147 are coupled to transformer 136, and endpoints 148 and 149 are coupled to transformer 138. However, a multitude of such endpoints may be coupled to each transformer, to serve thousands of users at each distribution station.

Each of the respective endpoints 140-149 communicates with one or more collectors 121 and 123 over the power distribution lines as shown, as the lines carry AC power. Accordingly, the respective endpoints share bandwidth over the power distribution lines, as may be relevant to concurrent communications and/or time-based communications involving different time periods during which each respective endpoint (or groups of endpoints) communicate. This approach may be carried out to facilitate effective communications with an acceptable or desirable amount of errors, in managing available bandwidth.

In addition to communicating utility-based data, available bandwidth is managed to facilitate the communication of firmware (e.g., for re-flash operations as discussed herein) to the endpoints 140-149, as well as acknowledgement and/or status-type data from the endpoints to the collectors 121 and 123, together with and/or scheduled in accordance with the communication of utility-based data from the endpoints. Firmware data, such as a firmware update or other data often stored in non-volatile memory, can be sent all or in part using one or more approaches as discussed herein. Similarly, response data from the respective endpoints can be interleaved with utility-based data, or otherwise communicated to facilitate configuration and re-flash types of operations at the respective endpoints.

In some implementations, a command center 150 controls the delivery of firmware from each respective collector (121, 123), by communicating with the transceiver (and, e.g., a collector thereat) over a communications network that may differ from a power line communications network. Accordingly, the command center 150 may determine which devices are to be re-flashed with new firmware, how to group devices and other related aspects.

Figure 2:
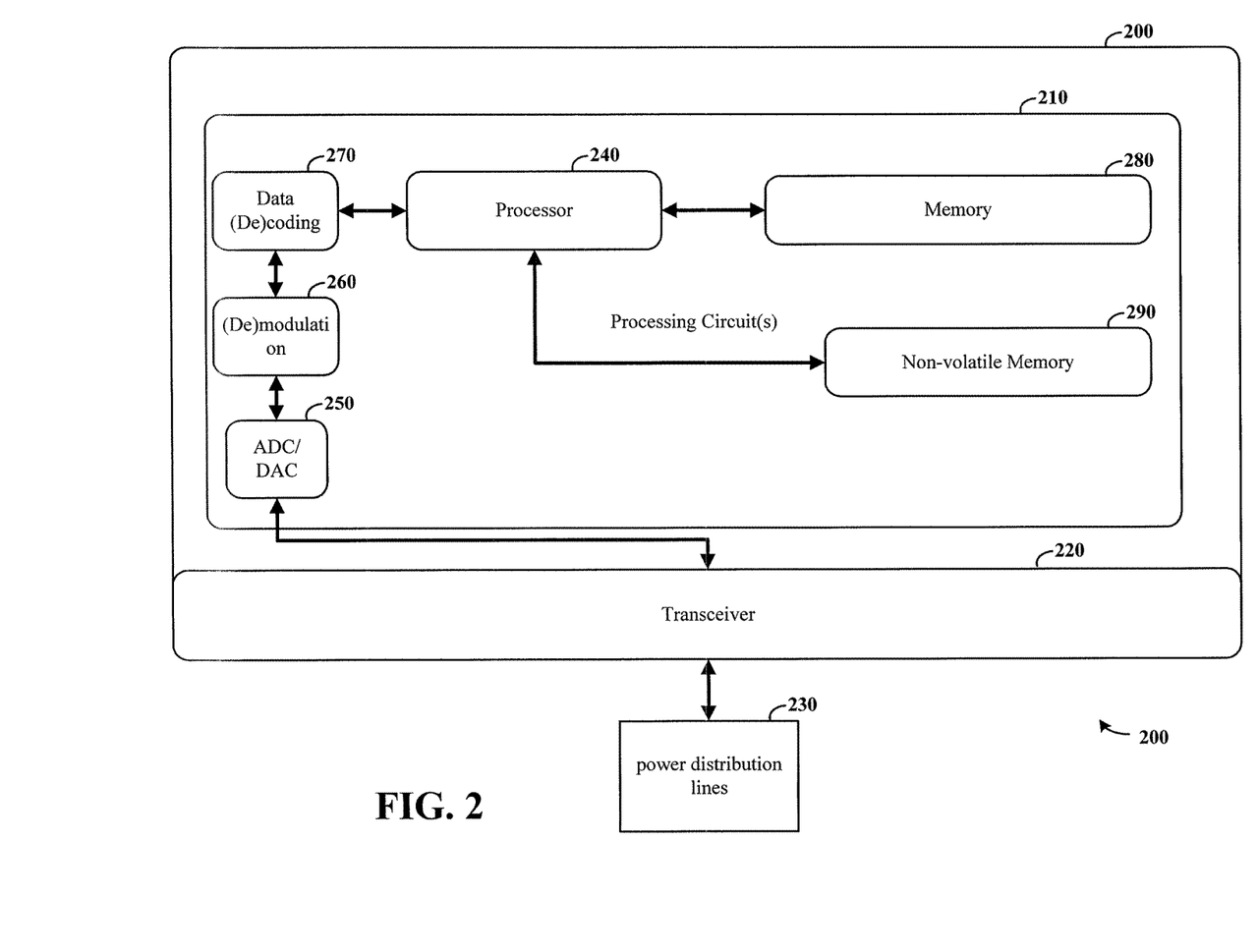
FIG. 2 shows a communications apparatus, consistent with other embodiments of the present disclosure.

FIG. 2 shows a communications apparatus 200, consistent with other example embodiments of the present disclosure. The apparatus 200 may be implemented in connection with a collector and/or an endpoint as discussed herein, to facilitate communications over power distribution lines.

The apparatus 200 includes processing circuit(s) 210 and a transceiver 220 for communicating over power distribution lines 230, such as the lines and related components as shown in FIG. 1. The processing circuit 210 includes a processor 240, including one or more logic circuits as discussed herein, which processes information received via the transceiver 220. More specifically, an analog-to-digital converter (ADC) 250 converts signals received at the transceiver 220, a modulator 260 demodulates the converted signals as presented from the ADC, and a coding circuit 270 decodes data from the demodulated signals as received from the modulator 260.

Correspondingly, data presented by (or as directed by) the processor 240 can be communicated over the power distribution lines 230, by encoding the data at the coding circuit 270, modulating the data at modulator 260, converting the data to analog data at the ADC/DAC circuit 250 and communicating the encoded and converted data via the transceiver 220. This presentation of data may, for example, involve the communication of status data using memory 280 (e.g., operating memory) or a non-volatile memory 290 (e.g., a flash memory that also stores firmware).

The decoded data provided by coding circuit 270 is used by the processing circuit 210, which may further store data in a memory 280 for use in processing and/or to store data pertaining to the received signals. For example, where the apparatus 200 is implemented at a collector, the collector may receive and store data received from endpoints, indicative of an acknowledgement or status update of the endpoints. Where the apparatus 200 is implemented at endpoints, received firmware may be stored in the memory 280, and the processor 240 may also generate and communicate a response using the stored data (e.g., to indicate a status of the endpoint).

Figure 3:
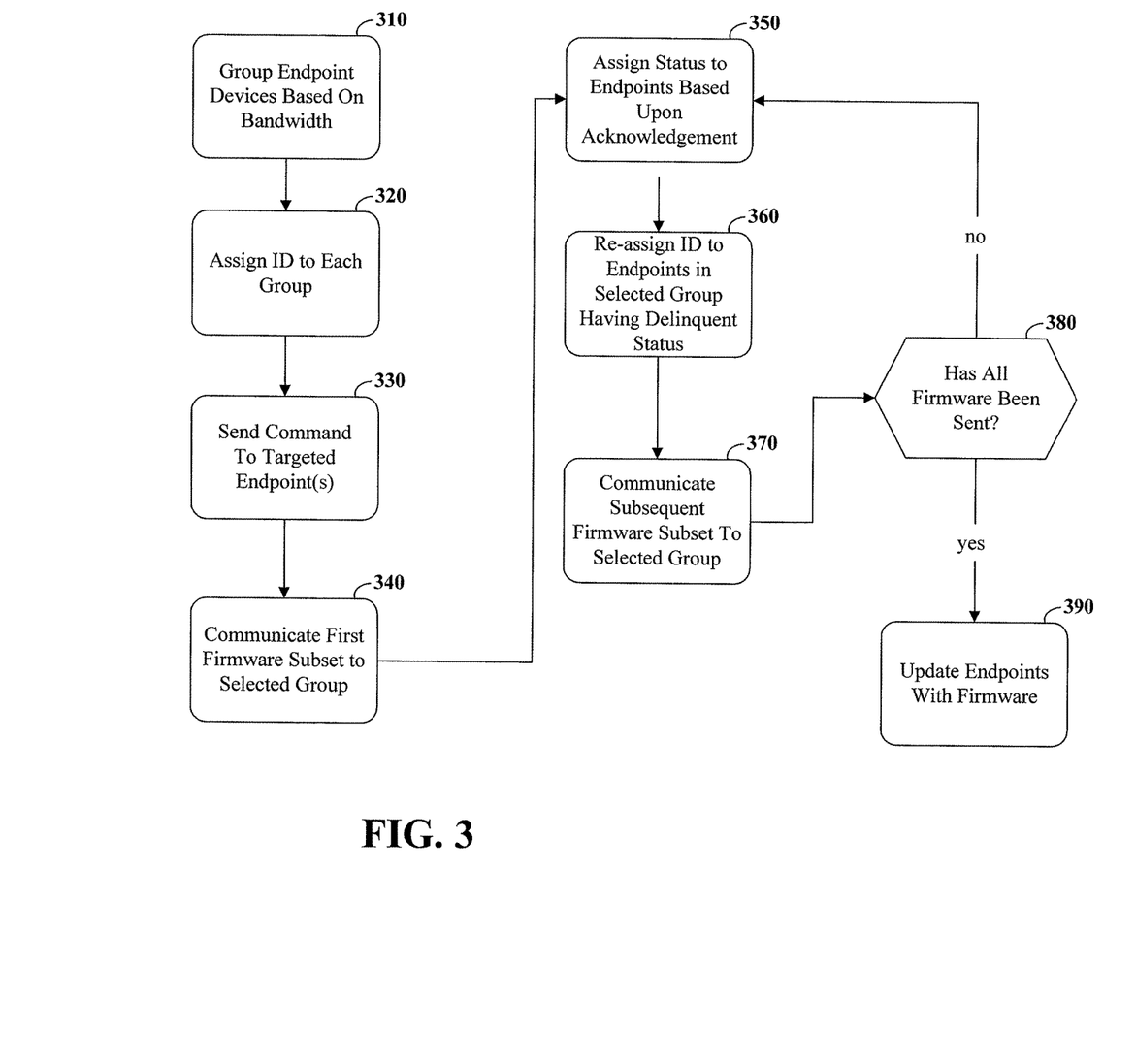
FIG. 3 is a flow diagram for configuring endpoints, consistent with other embodiments of the present disclosure.

FIG. 3 is a flow diagram for configuring endpoints, consistent with other example embodiments of the present disclosure. At block 310, endpoint devices are grouped based upon available bandwidth. For example, a set of firmware to be presented to groups of endpoints at a particular time can be presented to a number of different endpoints based upon the size of the data to be presented to each endpoint and available bandwidth. At block 320, an identification (ID) is assigned to each group. This grouping and ID can then be used to facilitate communications.

At block 330, a command (e.g., command such as a start re-flash command) is sent to one or more particular group IDs, such that endpoints having been assigned the particular group ID and listening for the command would receive and process the command. In this context, the command may be implemented as a broadcast command that is broadcast to multiple endpoints. At block 340, a first set of firmware is communicated to respective endpoints in the group. This communication may, for example, be predicated upon receiving an acknowledgement from some or all of the endpoints to which the command was sent.

At block 340, a status is assigned to the respective endpoints based upon the endpoints' acknowledgement (or response) to data communicated at block 330. For example, as discussed herein, an endpoint may send an alarm or other type of data to indicate an acknowledgement to a command or otherwise. In addition, a periodic (e.g., daily) status communication may be sent from endpoints to a controller, and indicate a status of the endpoint as may pertain to a stage or other condition relating to the receipt of one or more respective data sets and/or operational characteristics such as those that may relate to a re-flash. Accordingly, a status is assigned to each endpoint at block 350, based upon an acknowledgement or other communication at block 330.

At block 360, endpoints are re-assigned IDs according to a status thereof. For example, if several endpoints are behind in the receipt of one or more sets of data (e.g., as may result due to corrupted power line data communications), those endpoints may be identified with a new ID and removed from the reconfiguration process, such that the remaining endpoints that are up to date may continue the process without being held back. Those endpoints assigned a new ID may be configured separately at a later time (e.g., during a separate configuration process for those and potentially other endpoints falling behind, or with a manual configuration).

At block 370, another subsequent data subset is communicated to a selected group, to continue the configuration process. If all firmware has been sent to (and received at) the respective endpoints at block 380, the process for communicating data terminates and the respective endpoints can carry out a reconfiguration at block 390 (e.g., a re-boot). This reconfiguration may, for example, be carried out according to information identified in the command provided at block 330. If all firmware has not been sent and received at the endpoints at block 380, the process continues with a reassignment of status at block 350, re-assignment of IDs to delinquent endpoints at block 360 and communication of another data subset at block 370.

Figure 4:
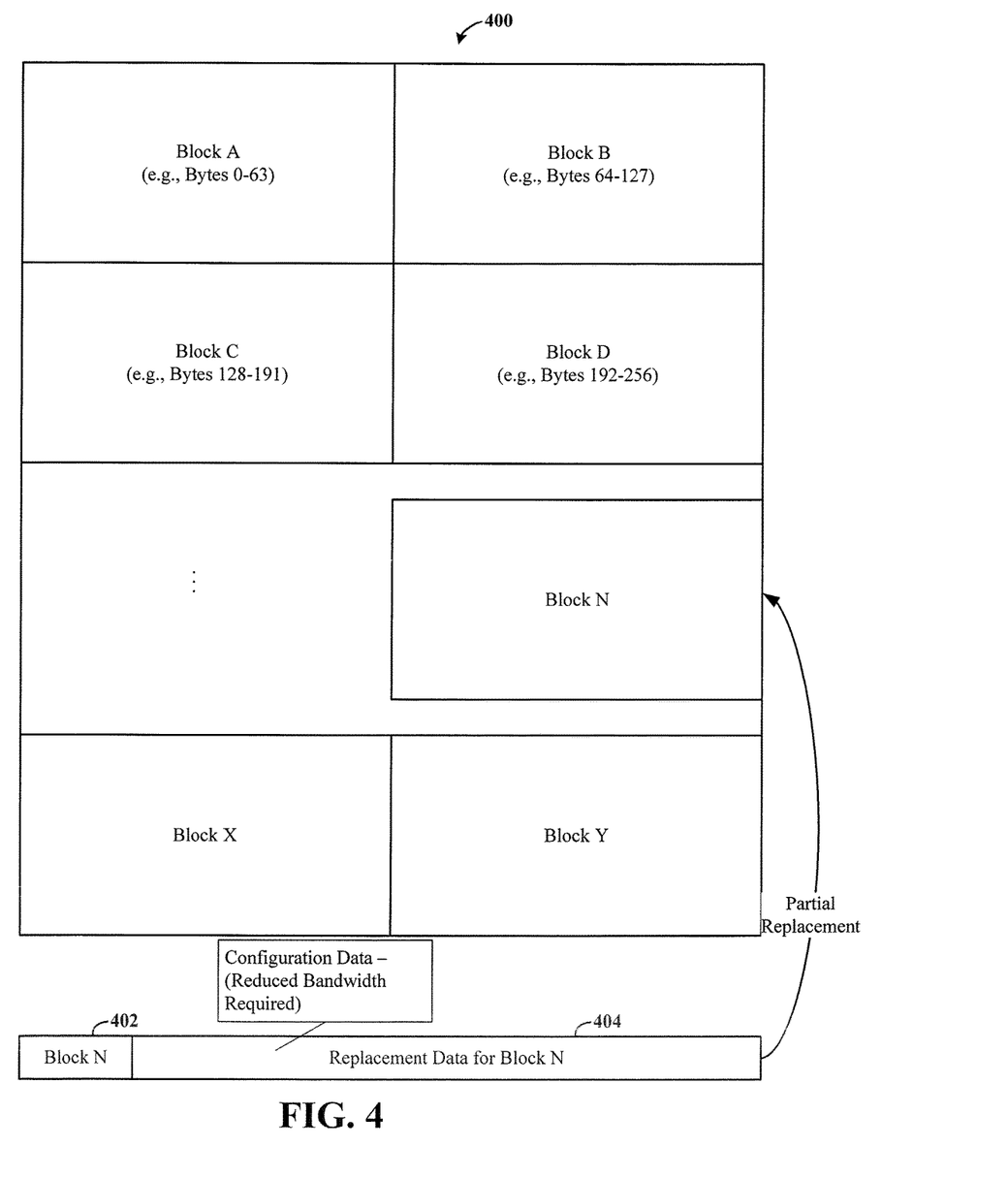
FIG. 4 shows a data structure for communications, consistent with other embodiments of the present disclosure.

FIG. 4 shows a data structure 400 for communications, consistent with other example embodiments of the present disclosure. As discussed herein, firmware can be sent to respective endpoints, and include an entirely new set of data or a partial set of data such as a patch. In some implementations, a partial set of data can be sent to selected endpoints that received most but not all of data communicated for a particular set of firmware, to effectively catch the endpoints up with other endpoints as pertaining to a status of data communicated thereto.

Accordingly, an incoming set of data includes identification data 402 and replacement data 404. By way of example, the replacement data 404 is shown as a replacement for an entire memory block "N," and the identification data 402 identifies the block "N" that is to be replaced. By way of example, data structure 400 is shown as having blocks A, B, C, D through blocks X and Y, with a block N being replaced therein.

In some implementations, the data structure 400 is implemented with a flash memory in which entire blocks are re-written. Accordingly, when the data 404 (or several such pieces of data) includes an entire block, that data can be used to replace an entire block "N" as shown.

In certain implementations, the data 404 is a subset of data for block "N." In such implementations, block "N" can be read and updated with the data 404, with the updated block used to replace block "N" as shown. For example, referring to FIG. 2, the data 404 can be communicated to apparatus 200 (when implemented at an endpoint), which may read and store block "N" in memory 280. The block "N" may be modified with data 404 prior to storage, or after storage and before implementation. Block "N" in data structure 400 (e.g., as stored in non-volatile memory 290) is then erased and replaced with a modified version of block "N."

Figure 5:
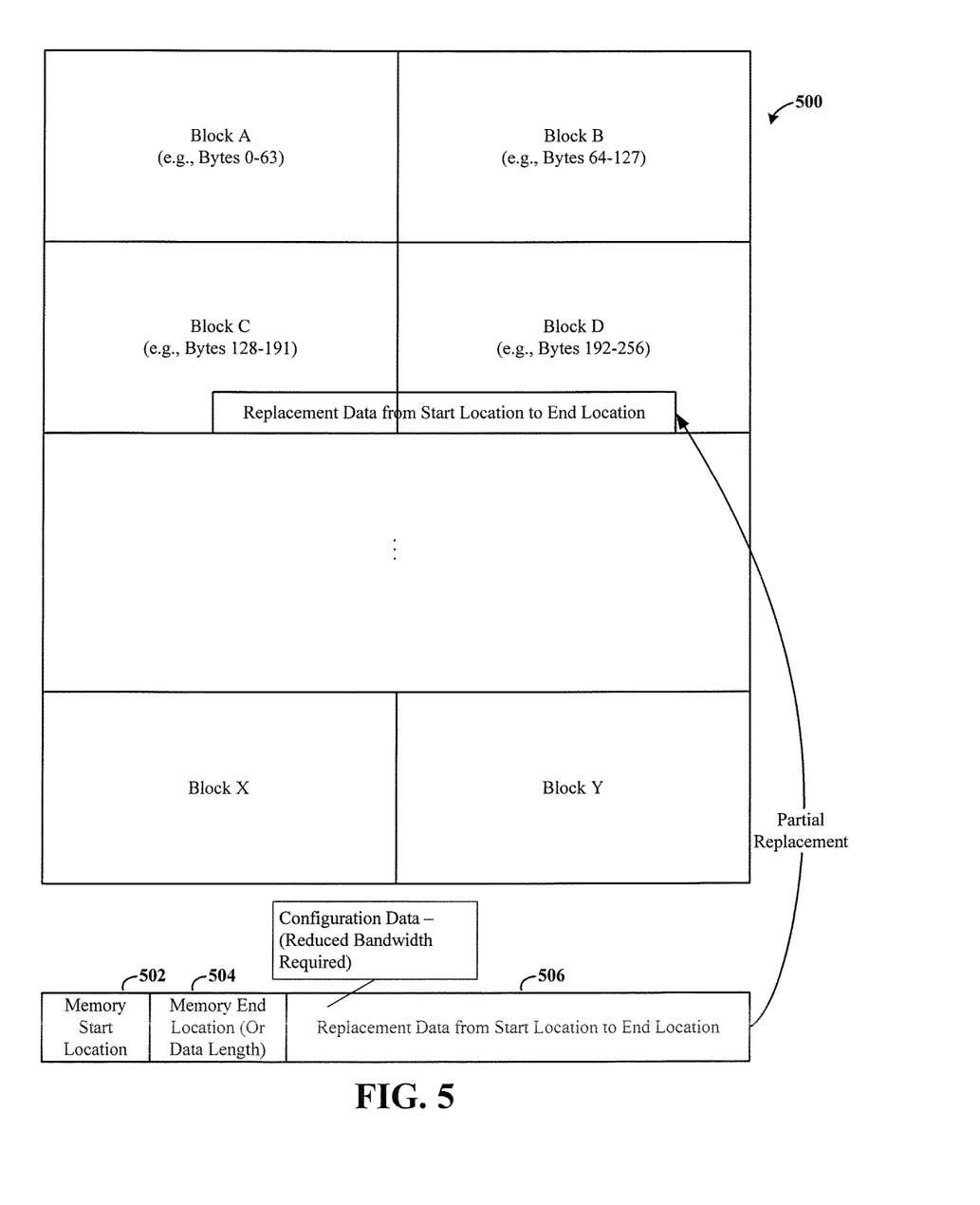
FIG. 5 shows a data structure for communications, consistent with other embodiments of the present disclosure.

FIG. 5 shows a data structure 500 for communications, consistent with other embodiments of the present disclosure. As discussed above, data can be communicated to an endpoint to replace a part of the data structure 500 as may be relevant, for example, to a communication error or providing a patch to firmware or other configuration-type data implemented at the endpoint.

Accordingly, the data structure 500 can be updated using an incoming data set including data 502 identifying a memory start location, data 504 identifying a memory end location (or data length), and replacement data 506 for actually replacing data in the structure 500. Many blocks are shown by way of example, including blocks A, B, C, D and X and Y, with the understanding that many additional blocks may also be present. The replacement data is inserted at an appropriate portion of the data structure 500, based upon the start and end location identified via data portions 502 and 504.

As with the above discussion of FIG. 4, the data structure 500 can be implemented with a flash memory in which entire blocks are re-written. When the data 506 includes data in both blocks C and D as identified via 502, 504, blocks "C" and "D" can be read and updated with the data 506, with the updated block used to replace block "N" as shown. Referring again to FIG. 2, the data 506 can be communicated to apparatus 200 (when implemented at an endpoint), which may read and modify blocks "C" and "D" using memory 280, erase those blocks as present in non-volatile memory 290, and write the modified blocks to memory 290. After complete, the apparatus 200 can be re-booted to operate with the new firmware including data in blocks "C" and "D."

The following discussion exemplifies a re-flash type of operation in which a plurality of endpoint devices are re-flashed with new firmware, as may be implemented in accordance with one or more of a variety of example embodiments (and/or the above-discussed figures) involving a power distribution network in which a plurality of endpoints are connected to each of a plurality of substations. First, a user sets up a re-flash operation from a command center user interface by specifying which endpoints (by serial number or group). If a group is specified, then the user may also optionally specify which substation(s) or switching group(s) should be included. The user also specifies an async (asynchronous) request packet definition that will automatically be sent back by the endpoint, and what time of day it should be sent. This may alternatively be specified as part of a configuration group setup, and not selected on a re-flash setup screen. The option of whether the endpoint should alarm at each stage advance can also be specified, as can the starting (old) firmware version (optional) and the target (new) firmware version. This information can be saved in a database from which the data can be retrieved and used to execute firmware updates.

A new scheduled task (re-flash task) in a collector service runs once per hour (default), and the collector checks to see if there is any re-flash work to do (e.g., start re-flash operations, or monitor running ones). For a start re-flash, the start re-flash command including async packet definition info is sent to the endpoints. The start re-flash command also specifies a starting virtual group number, which the next batch of re-flash commands will be group-addressed to.

As endpoints receive the command, then they will notify with an alarm that they heard the start re-flash. The first portion of the new firmware is sent to the appropriate collectors, which will repeat it at the specified priority until told otherwise. An event will then serve to update the database as to which re-flash commands were sent down in each period between scheduled task runs (per hour by default). If stage advance alarms are enabled, then the progress will be monitored using those. An org setting controls how many of the endpoints need to advance to a next stage before the next firmware portion is sent to collectors that collect data from respective endpoints. If stage advance alarms are disabled, then a predetermined set of portions are repeated.

When an endpoint hears all the commands for a stage, CRC checks the blocks and advances, it increments its virtual group number or block number, which indicates the endpoint's progress. Once a day, the endpoints send back the re-flash async information, which includes the virtual group number or block number corresponding to the stage that the endpoint is at. This information is used to update the database to indicate what stage each endpoint is at. The endpoints buffer firmware bytes in nonvolatile memory (data flash), then wait to write a portion (e.g., 4K) into flash, at the end of a long packet. For example, data to be written can be buffered to avoid corrupting an upstream packet.

When an endpoint has received all the new firmware and the CRCs match, it waits until the next flash write time, writes the last block to flash, reboots to the new firmware and then sends a "re-flash finished" alarm. If this alarm is missed, the endpoint's status can be discerned by detecting that the endpoint has stopped sending the re-flash progress async each day. After all the endpoints have finished, the collectors stop sending firmware according to the scheduled task. The collectors similarly stop sending firmware in response to a user input cancelling the re-flash operation. At any stage, a re-flash operation can be carried out in the field. When the result is synced back, or if re-flash is carried out in the field, this info is sent to a re-flash engine that saves it in the database to mark the endpoint's re-flash as having being completed.

A postpone or cancel-type re-flash operation may be carried out using one or more of a variety of approaches. In some implementations, a command center simply stops sending re-flash commands if a user cancels a re-flash operation. The endpoints respond to not receiving any re-flash-related command in a given day by stopping the return of a re-flash async. For example, an endpoint may return one re-flash async message in response to the start-flash, then no re-flash async messages for a few days until it hears a program flash command. The endpoint remembers the re-flash stage, such that re-flash commands can be halted for any number of days and then resumed, and the endpoint picks up where it left off. If the CC user wants to cancel (e.g., abort) the re-flash operation and re-flash commands are no longer sent, the endpoint stops sending re-flash async messages.

A variety of user interfaces can be implemented in connection with various example embodiments. In some implementations, a user interface device is configured to display screens providing functions for setup, initiation and cancelling re-flash operations, and to provide outputs such as outputs showing re-flash progress and re-flash history. Such interfaces can allow a user to schedule a re-flash event for a single endpoint, or specify a group of endpoints for re-flash. Further, the user interface may be configured to facilitate the selection of endpoints via an endpoint identification (e.g., meter number) or group identification (group ID's assigned to different endpoints), and the selection of one or more collectors, substations or switching group. A unique name or number can be assigned to the re-flash operation for reference.

In one implementation, a single endpoint is re-flashed using a single collector with a re-flash engine as follows. A user goes to start-re-flash screen at a user interface and specifies a meter number of the endpoint, a re-flash-async packet definition and time of day it should be returned. Alternatively, this information may be specified as part of the configuration group setup, and not selected on the re-flash setup screen. The user also sets whether stage advance alarms should be enabled, and identifies a target (new) firmware version. This information is saved in a database.

When the re-flash engine's scheduled task runs next, it will pick up this endpoint for a re-flash operation. A StartReflash command is sent to that endpoint's collector, to send downstream. If the "start re-flash alarm" is not heard when expected, the StartRe-flash command is re-sent until an alarm is received. Once the start re-flash alarm is received, a first firmware portion is sent to the collector, to start sending downstream (repeating until controlled otherwise). If stage advance alarms are enabled, then as they come in, the readings engine sends them to the re-flash engine.

Each day that a re-flash async message is returned from an endpoint, the re-flash stage group number that the endpoint is at is identified. The readings engine will send this to the re-flash engine, which will save it in the database. For each endpoint, both "estimated stage" and "verified stage" columns are maintained in a tracking table. If stage advance alarms are enabled, an estimated stage is updated with a stage that the endpoint is estimated to be at. The verified stage value is updated with the re-flash async virtual group number. The re-flash engine is configured with logic that adjusts the stage number, which causes the re-flash engine to get back on track if the estimated stage number is different than the verified stage number when the verified number is received. The re-flash progress screen in the user interface shows the stage at which the endpoint is at.

When the endpoint finishes re-flashing, it will send a "re-flash finished" alarm, which the readings engine sends to the re-flash engine, which updates the database. Once the last endpoint in a re-flash operation is finished, the re-flash engine sends a communication to inform the collector to stop sending the firmware portion. The re-flash history screen shows the re-flash history, including all the relevant details specified in the start re-flash, to the start and end date for each endpoint.

In another implementation, a group of endpoints are re-flashed using a single collector as follows. A user specifies, via a start-re-flash screen of a user interface, a group (model or configuration), a specific collector, the re-flash-async packet definition and time of day it should be returned. Alternatively, this may be specified as part of the configuration group setup, and not selected on the re-flash setup screen. The user also specifies whether stage advance alarms should be enabled, optionally specifies the existing (old) firmware version, and specifies the target (new) firmware version. This information is also saved to a database.

When the re-flash engine scheduled task runs next, it will pick up this group for a re-flash operation. The StartRe-flash command is sent to the collector, to send downstream, addressed to the group, and the endpoints send back the "start re-flash" alarm. The collector keeps resending the StartRe-flash command until the alarm is received from a specified percentage of endpoints in an organizational setting (that controls how many endpoints are needed to advance to each stage).

Once the start re-flash alarms are received, the first firmware portion is sent to the collector, to start sending downstream, with the collector repeating the communication of the firmware portion until told otherwise. If stage advance alarms are enabled, then as they come in, the readings engine sends them to the re-flash engine. With a large number of endpoints, the re-flash engine may simply record in the database, for each one, and lets the scheduled re-flash engine task determine how to proceed each hour. When the re-flash engine is called, it records which commands were sent downstream and when. The re-flash engine determines when it needs to send the next firmware portion to the collector, based on the percentage of endpoints organizational setting. Each day the re-flash async message is returned, indicates the re-flash stage group number the endpoints are at. The readings engine sends this to the re-flash engine, which saves the information in the database.

For each endpoint, both "estimated stage" and "verified stage" columns are maintained in a tracking table. If stage advance alarms are enabled, then the estimated stage is updated with the stage we think the endpoint is at. The verified stage value is updated with the re-flash async virtual group number. The re-flash engine includes logic configured to correct the engine if the estimated stage number is different than the verified stage number when the verified number is received. A re-flash progress screen in the user interface can show the stage at which the endpoint is at, and a summary of how the entire group is doing (e.g., an overall summary, and how many endpoints are in each stage).

When the endpoint finishes re-flashing, it sends a "re-flash finished" alarm, which the readings engine sends to the re-flash engine, and that will update the database. Once the last endpoint in a re-flash operation is finished, the re-flash engine controls the collector to stop sending the firmware portion. The re-flash history screen shows the re-flash history, including relevant details specified in the start re-flash, the start and end date for each endpoint, and the details for the group. The history screen also shows the straggler endpoints that were left behind. If endpoints are stuck at previous stages, the process can resume accordingly (e.g., if only one endpoint is stuck at stage 2 but 50 endpoints are stuck at stage 30, the endpoint stuck at stage 2 can be dropped from the process, and a stage 30 communication can be initiated to address the 50 endpoints at that stage). A user may also mark/identify endpoints that they will visit manually or otherwise address at a later time.

In other example embodiments, a group of endpoints is re-flashed using multiple collectors as follows. A user specifies settings such as above, using a user interface, while also specifying two or more collectors as well as firmware, timing options and such. The endpoints alarm with respect to received commands and status, with the stages being advanced according to the endpoint progression (e.g., a predefined threshold of endpoints achieving a stage, with respect to all endpoints, endpoints at each collector or groups of endpoints). Tracking and reporting can also be carried out similarly as above, with additional information per collector. In these contexts, one or more collectors may be advanced in stage, relative to other collectors such as may be based upon characteristics of the respective collectors.

A user interface as discussed herein can be implemented in a variety of manners. In some implementations, a user interface is implemented to specify a re-flash operation name, or re-flash operation id number, and may provide a search function for identifying re-flash operations started within a given date range and from which (list) an operation can be selected. Once a re-flash operation is selected, the interface may show overall details for the re-flash operation displayed at the top of the screen. For instance, the screen may display a re-flash operation name and ID number, with a link to a popup that shows the info specified for the operation on the setup screen, and identifying a user that initiated the re-flash.

Other interactive aspects may include a checkbox for including completed endpoints (default is not checked) and when, if checked, the page refreshes and the result set includes endpoints from this re-flash operation that have completed. A current stage combobox can display all stages, with the current stage selected. The user can choose a different stage if he or she wants (for example, to move on and leave straggler endpoints behind, or to go back to an earlier stage to try and pick up some stragglers). A cancel button may be used to cancel a re-flash operation that hasn't completed on its own. Progress can be shown for each endpoint as relevant to meter number, serial number, latest/current re-flash stage (with an optional link that pops up a window that shows every stage and the date/time it transitioned to that stage). Other information, such as information pertaining to physical reconfiguration/re-flashing, or re-flash progress can also be displayed for the respective endpoints.

Consistent with various embodiments of the present disclosure, the power distribution lines can carry power that is provided from one or more generating stations (power plants) to residential and commercial customer sites alike. The generating station uses AC to transmit the power long distances over the power distribution lines. Long-distance transmission can be accomplished using a relatively high-voltage. Substations located near the customer sites provide a step-down from the high-voltage to a lower-voltage (e.g., using transformers). Power distribution lines carry this lower-voltage AC from the substations to the customer sites. Depending upon the distribution network, the exact voltages and AC frequencies can vary. For instance, voltages can generally be in the range 100-240 V (expressed as root-mean-square voltage) with two commonly used frequencies being 50 Hz and 60 Hz. In the United States, for example, a distribution network can provide customer sites with 120 V and/or 240 V, at 60 Hz.

The signals and associated logic and functionality described in connection with the figures can be implemented in a number of different manners. Unless otherwise indicated, various general purpose systems and/or logic circuitry may be used with programs in accordance with the teachings herein, or it may prove convenient to construct a more specialized apparatus to perform the required method. For example, according to the present disclosure, one or more of the methods can be implemented in hard-wired circuitry by programming a general-purpose processor, other fully or semi-programmable logic circuitry, and/or by a combination of such hardware and a general-purpose processor configured with software.

It is recognized that aspects of the disclosure can be practiced with computer/processor-based system configurations other than those expressly described herein. The required structure for a variety of these systems and circuits would be apparent from the intended application and the above description.

The various terms and techniques are used by those knowledgeable in the art to describe communications, protocols, applications, implementations, mechanisms, etc. One such technique is the description of an implementation of a technique expressed in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, it is recognized that a block denoting "C=A+B" as an additive function whose implementation in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions can be stored for execution in a manner consistent with one or more of the methods of the present disclosure. The instructions can be used to cause a general-purpose or special-purpose processor that is programmed with the instructions to perform the steps of the methods. Alternatively, the steps might be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration only and should not be construed to limit the disclosure. Based on the above discussion and illustrations, those skilled in the art will readily recognize that various modifications and changes may be made to the present disclosure without strictly following the exemplary embodiments and applications illustrated and described herein. For instance, such changes may include variations on mechanisms for synchronization with (and/or tracking of) the AC line frequency and/or the use of communication protocols that are not expressly mentioned. Such modifications and changes do not depart from the true spirit and scope of the present disclosure, which is set forth in the following claims.

What is claimed is:

1. A method for communicating firmware in a power distribution system over power distribution lines carrying alternating current (AC) power, where bandwidth is shared between a plurality of endpoint devices that are configured with circuitry to provide utility usage data over the power distribution lines, the method comprising:
   receiving at the plurality of endpoint devices and over the power distribution lines a command to change, by updating, firmware stored in the plurality of endpoint devices;
   identifying, by a circuit configured and arranged to collect data in the power distribution system, a first subset of endpoint devices from the plurality of endpoint devices in response to receipt of a first acknowledgment of the command from the first subset of endpoint devices;
   communicating, by the circuit configured and arranged to collect data, to the first subset of endpoint devices over the power distribution lines a first subset of the firmware;
   identifying, by the circuit configured and arranged to collect data, a second subset of endpoints devices from the first subset of endpoint devices in response to receipt of second acknowledgement relating to the first subset of firmware indicating, in a cyclic status communication, a configuration stage of the second subset of endpoint devices and interleaved with utility usage data received over the power distribution lines, the utility usage data being indicative of at least one of power meter data, readings of water utilities, and readings of gas utilities; and
   communicating, by the circuit configured and arranged to collect data, at least a second subset of the firmware to the second subset of endpoint devices for updating firmware in the second subset of the endpoint devices.

2. The method of claim 1, wherein each of the endpoint devices includes a circuit configured and arranged to collect and communicate the utility usage data, the utility usage data indicative of power consumption.

3. The method of claim 1, wherein the subsets of the firmware are communicated over the power distribution lines according to a communication protocol using timing for cyclic communications of the utility usage data between at least one of the endpoint devices and a collector device, including a circuit configured and arranged to collect data, and wherein the command identifies a set of endpoint devices that is selected based upon an available bandwidth on the power distribution lines.

4. The method of claim 1, wherein communicating the second subset of the firmware includes communicating additional subsets of the firmware in stages, based upon a number of the endpoint devices acknowledging receipt of a subset of firmware communicated in a previous stage, until a full set of the firmware has been communicated.

5. The method of claim 1, wherein the communicating at least the second subset of the firmware to the second subset of endpoint devices includes assigning, the second subset of the endpoint devices of a group identification that is based upon a status condition indicating that the second subset of endpoint devices have received the second subset of firmware.

6. The method of claim 1, further comprising, at the plurality of endpoint devices, communicating a status condition characterizing the received subsets and, in response to receiving a full set of firmware, rebooting using the full set of firmware.

7. The method of claim 1, wherein the command includes data that specifies a time for re-flashing of firmware of the plurality of endpoint devices.

8. A circuit-based apparatus in a power distribution system comprising:
   a transceiver circuit configured and arranged to communicate, to a plurality of endpoint devices, data over power distribution lines that carry power using alternating current (AC), based on timing indicated at least in part by the alternating current; and
   a processing circuit configured and arranged to:
      receive at an endpoint device and over the power distribution lines an indication that changes, by updates, to stored firmware in the endpoint device are requested;
      in response to a determination of available bandwidth on the power distribution lines for changes to stored firmware in the endpoint device and at least one other endpoint device in the plurality of endpoint devices, communicate and receive at the endpoint device over the power distribution lines and based on timing indicated at least in part by the alternating current:
         a command conveyed between the endpoint device and a collector circuit, configured and arranged to collect data in the power distribution system, which is communicatively coupled with a command center over the power distribution lines,
         a first subset of the firmware designated for the endpoint device and the at least one other endpoint device for updating the endpoint device and the at least one other endpoint device, in response to after receipt of acknowledgement from the endpoint device and the at least one other endpoint device received via the power distribution lines, and
         at least one additional subset of the firmware to at least the endpoint device and the at least one other endpoint device for updating the endpoint device and the at least one other endpoint device, based upon a response of the endpoint devices received over the power distribution lines indicating, in a cyclic status communication, a configuration stage of the endpoint devices and interleaved with utility usage data, the utility usage data being indicative of at least one of power meter data, readings of water utilities, and readings of gas utilities.

9. The apparatus of claim 8, wherein the processing circuit is further configured and arranged to communicate a request to restart the endpoint device using at least one of the subsets of firmware, and wherein each of the endpoint devices is a circuit configured and arranged to collect and communicate data indicative of power consumption.

10. The apparatus of claim 8, wherein the processing circuit is further configured and arranged to communicate restart data that indicates at least one endpoint device is to be restarted using at least one of the subsets of firmware.

11. The apparatus of claim 8, wherein the processing circuit is further configured and arranged to:
   communicate restart data that indicates one or more endpoint devices is to be restarted using at least one of the subsets of firmware; and
   receive an assigned group identification (ID) and in response to the update status indicating that the one or more endpoint devices has not received firmware packets, receive an assigned different second group ID.

12. The apparatus of claim 8, wherein the processing circuit is further configured and arranged to:
   provide a request to restart the one or more endpoint devices to use the first and second subsets of firmware.

13. A circuit-based apparatus in a power distribution system comprising:
   transceiver circuitry, including a transformer, configured and arranged to communicate, to a plurality of endpoint devices, data over power distribution lines that carry power using alternating current (AC), based on timing indicated at least in part by the alternating current; and
   processing circuitry, including a computer, configured and arranged to communicate information by:
      in response to a determination of and related communication to indicate available bandwidth on the power distribution lines for changes to stored firmware in an endpoint device and at least one other endpoint device in the plurality of endpoint devices, communicating and receiving at the endpoint device over the power distribution lines and based on timing indicated at least in part by the alternating current:
         a command conveyed between the endpoint device and a collector circuit, configured and arranged to collect data in the power distribution system, which is communicatively coupled with a command center over the power distribution lines,
         a first subset of the firmware designated for updating the endpoint device and the at least one other endpoint device, in response to and after receipt of acknowledgement from the endpoint device and the at least one other endpoint device received via the power distribution lines, and
         at least one additional subset of the firmware to at least the endpoint device and the at least one other endpoint device for updating the endpoint device and the at least one other endpoint device, based upon a response of the endpoint devices received over the power distribution lines indicating, in a cyclic status communication, a configuration stage of the endpoint devices and interleaved with utility usage data, the utility usage data being indicative of at least one of power meter data, readings of water utilities, and readings of gas utilities.

14. The apparatus of claim 13, further including circuitry configured and arranged to communicate a request to restart the endpoint device using at least one of the sets of firmware.

15. The apparatus of claim 13, further including circuitry configured and arranged to communicate restart data that indicates the endpoint devices is to be restarted using at least one of the sets of firmware.

16. The apparatus of claim 13, wherein each of the endpoint devices is a circuit configured and arranged to collect and communicate data indicative of power consumption.

\* \* \* \* \*